G. MATTHEIS.
PUSH TRACTOR.
APPLICATION FILED DEC. 17, 1920.

1,435,076.

Patented Nov. 7, 1922.

Inventor
Gottlieb Mattheis,
By G. Hume Talbert
Attorney

Patented Nov. 7, 1922.

1,435,076

UNITED STATES PATENT OFFICE.

GOTTLIEB MATTHEIS, OF BEULAH, NORTH DAKOTA.

PUSH TRACTOR.

Application filed December 17, 1920. Serial No. 431,477.

*To all whom it may concern:*

Be it known that I, GOTTLIEB MATTHEIS, a citizen of the United States of America, residing at Beulah, in the county of Mercer and State of North Dakota, have invented new and useful Improvements in Push Tractors, of which the following is a specification.

The object of the invention is to provide a relatively simple push tractor for use in connection with push headers and like agricultural machinery, and also as a means of use as a stationary engine for driving threshers, feed cutters and the like, whereby a short or right angle turn of the header or other farm machinery may be effected at the corners of the field in which such machine is being operated; and with this object in view the invention consists in the construction and combination of parts of which a preferred embodiment is shown in the drawing wherein:—

Figure 1:
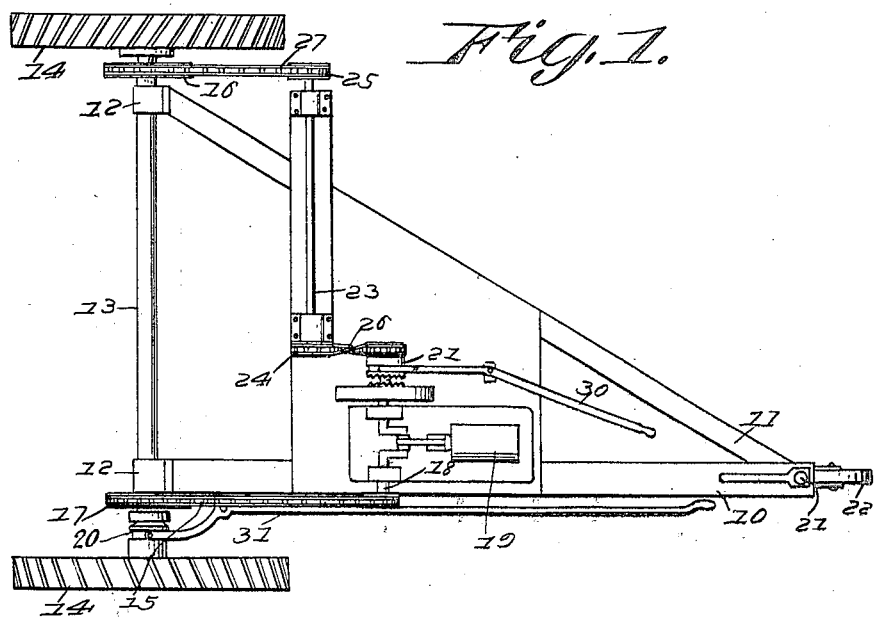
Figure 1 is a plan view of the tractor.
Figure 2:
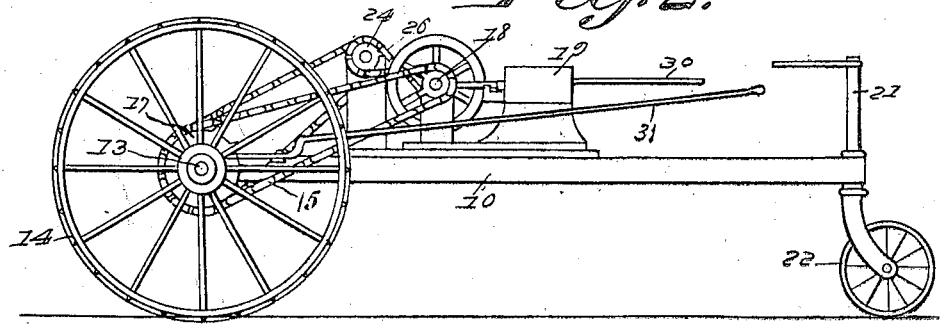
Figure 2 is a side view of the same.

The apparatus consists essentially of a frame having a push beam 10 adapted to operate in a position substantially parallel with the path of movement of the tractor and of the agricultural machine in advance thereof which is being pushed by the tractor, a rearwardly divergent base frame 11 extending from the forward end of the push beam, the rear portions of said push beam and brace beam are provided with bearings 12 in which is mounted the drive shaft 13 carrying the traction wheels 14 by which the apparatus is propelled.

Carried by the shaft 13 are the sprocket wheels 16 and 17 by which motion is communicated to the shaft. Forward driving movement is communicated through the sprocket 17 by means of a chain 15 which is trained thereover and over a sprocket carried on the crank shaft 18 of a driving unit 19 preferably of the internal combustion type. A clutch 20 is provided to effect and release the operative connection between the sprocket wheel 17 and the shaft 13, this clutch being under the control of the operator of the machine through the medium of a hand lever 31.

The sprocket wheel 16 is designed to impart rearward movement to the apparatus, to which end a chain 27 is employed which is trained over the sprocket 16 and over a similar sprocket 25 mounted on a countershaft 23, the latter being driven by the driving unit or motor 19 through the instrumentality of a chain 26 which is trained over a sprocket 24 carried at the adjacent end of the countershaft 23, and over a sprocket mounted on the motor crank shaft 18 at the end opposite the sprocket and carrying the chain 15. The sprocket driving the chain 26 is released from or may be fast to the crank shaft of the motor by means of a clutch 21 operable by means of a hand lever 30 disposed in position for actuation by the operator of the apparatus. The chain 26, it will be noted, is crossed, so that movement in the opposite direction from that in which the motor rotates is communicated to it. Thus when the clutch 21 is employed, retrograde or rearward movement is imparted to the drive shaft 13 and hence to the traction wheels.

Steering of the apparatus is effected through the instrumentality of a steering wheel 22 of the castor type carried at the lower end of a steering post 21 by means of which angular movement may be imparted to the said steering wheel.

Having described the invention, I claim:

A push tractor for the purpose indicated having a frame consisting of a push beam disposed for movement in parallelism with the path of the machine and a rearwardly divergent brace beam, a drive shaft mounted in bearings at the rear end of said push and brace beams, traction wheels mounted upon said drive shaft, a motor carried by the frame, a clutch controlled chain drive between the motor shaft and the drive shaft, a countershaft mounted on the frame and having a driving connection with the drive shaft and a clutch controlled driving connection between the motor shaft and the countershaft, the said latter connection rotating the countershaft reversely to the motor shaft, and a steering wheel at the forward end or apex of the frame of the machine.

In testimony whereof I affix my signature.

GOTTLIEB MATTHEIS.